Figure 1:
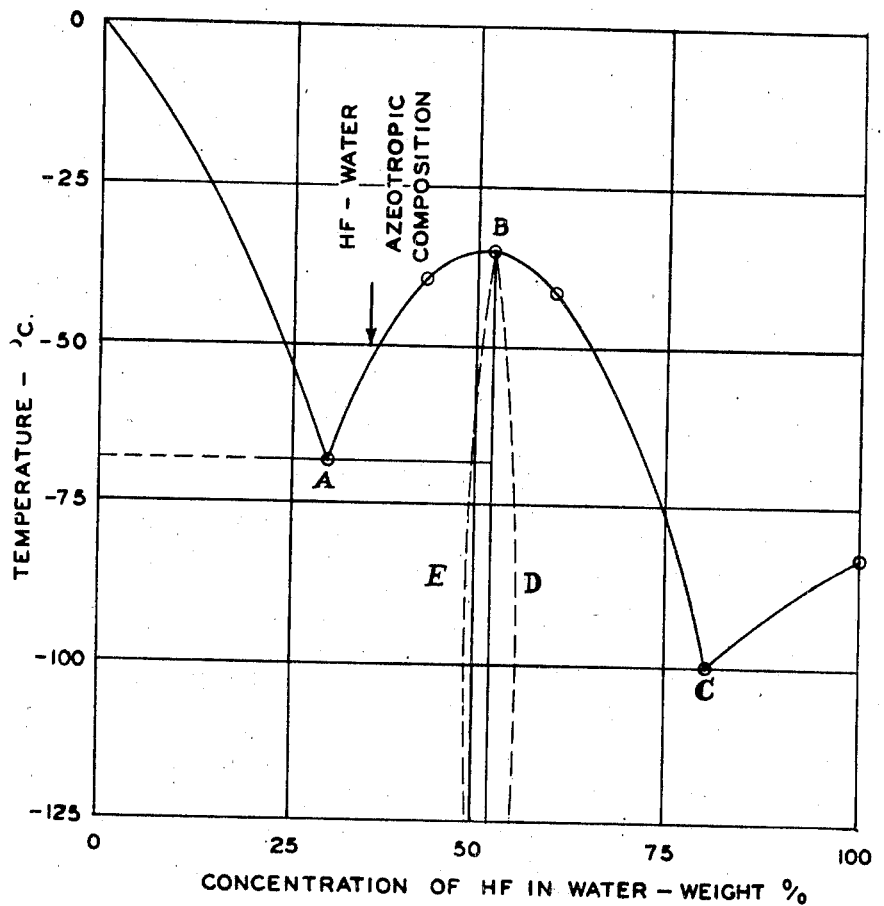

INVENTOR.
CRUZAN ALEXANDER
BY Hudson and Young
ATTORNEYS

Patented Jan. 4, 1949

2,458,044

UNITED STATES PATENT OFFICE 2,458,044

METHOD OF RECOVERING HYDROGEN FLUORIDE FROM AN AZEOTROPIC MIXTURE BY CRYSTALLIZATION

Cruzan Alexander, Bartlesville, Okla., assignor to Phillips Petroleum Company, a corporation of Delaware Application December 17, 1945, Serial No. 635,593

13 Claims. (Cl. 260—683.4)

This invention relates to the recovery of hydrogen fluoride. In one embodiment this invention relates to the recovery of anhydrous hydrogen fluoride from an azeotropic mixture with water. Another aspect of this invention relates to a hydrocarbon conversion process using a hydrogen fluoride catalyst.

The requirement for a substantially anhydrous hydrogen fluoride has been increased in recent years because of its use in the anhydrous condition as a catalyst in promoting and economically effecting certain types of hydrocarbon conversions. For example, anhydrous or highly concentrated hydrogen fluoride is used as a catalyst in the conversion of hydrocarbons by alkylation, isomerization, cracking, cyclization and aromatization; as a reactant in production of alkyl fluorides; and as a scrubbing agent for selective solvents in the removal of certain impurities from saturated hydrocarbons.

Hydrogen fluoride is manufactured at a temperature of 300 to 400° F. by the reaction between calcium fluoride and sulfuric acid, followed by subsequent distillation which produces a product containing some water. It is very difficult, yet essential, to free the hydrogen fluoride of water acquired during its manufacture or water acquired in the course of carrying out the above indicated hydrocarbon conversions where the hydrogen fluoride continuously becomes more concentrated with water which is brought into the process with the reacting materials. The increase in the water content of the hydrogen fluoride during a hydrocarbon conversion process is usually caused by the tendency of the hydrogen fluoride to dissolve water contained in the hydrocarbon feed.

To a certain extent water can be removed from the hydrogen fluoride by distillation and in some cases by electrolysis. It is also possible to add such chemicals as caustic soda or lime which combines with the hydrogen fluoride and subsequently the hydrogen fluoride is reliberated by a strong acid to obtain a substantially anhydrous product. Such processes for freeing the hydrogen fluoride of water are, however, relatively expensive and often not reliable. For example, in the conversion of hydrocarbons in the presence of hydrogen fluoride, the hydrogen fluoride is recovered in a series of fractional distillation steps which ultimately result in the formation of an azeotropic mixture of water with a portion of the hydrogen fluoride. Because of the extreme difficulty in separating the remaining hydrogen fluoride from this azeotropic mixture, the azeotropic mixture is usually discarded with the resulting loss of the hydrogen fluoride contained therein and also with the resulting dangers to health accompanying its disposal. This azeotropic mixture, which is a maximum-boiling solution, contains approximately 35 to 37 weight per cent of hydrogen fluoride.

Since in commercial processes for the conversion of hydrocarbons the loss of hydrogen fluoride is significant, a method for substantially complete recovery of highly concentrated or anhydrous hydrogen fluoride is much to be desired. Furthermore, certain concentrations of hydrogen fluoride and water are very corrosive to various types of construction materials. Consequently, a method to control and minimize the percentage of water in the hydrogen fluoride throughout a conversion process would simplify the construction of process equipment. In this respect, copper and Monel metal are substantially the only kinds of metal which can be used over a relatively large range of concentrations of water in hydrogen fluoride; however, if the concentration of water could be maintained less than about 40 per cent throughout the process the use of steel and cast iron would be possible.

The object of this invention is to recover concentrated hydrogen fluoride from an admixture with other materials.

Another object of this invention is to recover concentrated, or anhydrous, hydrogen fluoride from an azeotropic mixture of hydrogen fluoride and water.

Still another object is to recover a substantially anhydrous hydrogen fluoride from an admixture of hydrogen fluoride with hydrocarbons.

Another object is to maintain a substantially water-free hydrogen fluoride having non-corrosive effects on steel and cast iron in hydrocarbon conversion processes.

Another object is to decrease the cost of hydrogen fluoride recovery and make-up in hydrocarbon conversion processes.

Other objects and advantages of the present invention will become apparent to those skilled in the art from the accompanying disclosure and description.

According to this invention, concentrated, or even substantially anhydrous, hydrogen fluoride is recovered from an aqueous solution containing same by crystallization. In its broad aspect this invention comprises cooling an aqueous solution to form a solid phase and a liquid phase and recovering that phase most concentrated in hydrogen fluoride as a product of the process, the recovered phase being more concentrated with hydrogen fluoride than the original solution.

In one embodiment of this invention concentrated, or substantially anhydrous, hydrogen fluoride is recovered from an aqueous azeotropic solution containing about 35 to about 37 weight per cent hydrogen fluoride by cooling the solution below about −55° C. and not lower than about −69° C. to form crystals containing between 50 and about 54 weight per cent hydrogen fluoride. These crystals are melted and the resulting solution is distilled to obtain concentrated, or substantially anhydrous, hydrogen fluoride as an overhead product from the distillation.

Figure 1 is a phase diagram for a hydrogen fluoride-water system in the liquid-solid range derived from the experimental data in Table I.

TABLE I

*Hydrogen fluoride-water system*

| Weight Per Cent Hydrogen Fluoride | Freezing Temperature, °C. |
| --- | --- |
| 100 | −83 |
| 80 | −100 |
| 60 | −42 |
| 52 | −35 |
| 43 | −39 |
| 30 | −69 |
| 0 | 0 |

The phase diagram of Figure 1 exhibits two eutectic points, A and C, and one congruent point, B. Congruent point B indicates the formation of either a hydrate, such as $HF \cdot H_2O$, or a solid solution containing between about 50 and about 54 weight per cent hydrogen fluoride as represented by the area between dotted lines D and E. Eutectic points A and C indicate that at the temperatures of formation of these eutectics there is a halt in the cooling curve at which the entire solution of the eutectic composition solidifies. In cooling a solution having a composition between the composition of point A and point B, crystals of a hydrate or solid solution precipitate from the solution. As crystals precipitate the concentration of hydrogen fluoride in the solution decreases until the composition of the solution reaches the composition of eutectic A. At eutectic A, on further cooling, the entire solution solidifies.

In carrying out the referred embodiment of this invention, the temperature during crystallization is maintained between the temperature at which eutectic A is formed and the temperature at which the hydrate or solid solution at congruent point B is formed. Thus, in recovering substantially anhydrous hydrogen fluoride from an aqueous azeotropic mixture of hydrogen fluoride, the azeotropic mixture is cooled to a temperature between about −55 and about −69° C. The crystals containing about 52 weight per cent hydrogen fluoride formed by the resulting crystallization are melted and the melt is distilled to recover substantially anhydrous hydrogen fluoride as a vaporous product.

The lean mother liquor from the crystallization has a lower hydrogen fluoride content than the original azeotropic mixture, usually a hydrogen fluoride content not less than about 30 weight per cent. Lean mother liquor may be reconcentrated to the azeotropic composition by distillation. During distillation of the lean mother liquor water vapor is removed as an overhead product and an azeotropic mixture is removed as a liquid bottom product. The bottom product is then returned to the crystallization zone.

The liquid bottom product obtained from the distillation of the melted crystals is also an azeotropic mixture of water and hydrogen fluoride, which may be returned to the crystallization zone. By recycling the bottom products from the distillation of the melted crystals and the lean mother liquor to the crystallization zone, substantially all of the hydrogen fluoride is recovered.

In another embodiment of the present invention an aqueous solution containing between about 50 and about 80 weight per cent hydrogen fluoride may be concentrated by crystallization. Often in commercial processes aqueous solutions of hydrogen fluoride become more dilute and must be concentrated to their original strength. For example, a 70 or 80 weight per cent hydrogen fluoride solution may decrease on use to a 60 per cent solution. The diluted solution may be concentrated by cooling the solution to a temperature between about −55 and about −100° C. to form crystals. The crystals formed contain between about 50 and about 54 weight per cent hydrogen fluoride with the balance water, which results in a removal of water from the mother liquor. In this manner the mother liquor becomes more concentrated with respect to hydrogen fluoride. The mother liquor may be concentrated to any desired hydrogen fluoride content between about 52 and about 80 weight percent, depending on the temperature of crystallization used. This particular embodiment of the invention is carried out within the range between congruent point B and eutectic C of Figure 1.

In a similar manner an aqueous solution containing between about 30 and about 52 weight per cent hydrogen fluoride may be concentrated by cooling the solution to a temperature sufficiently low to form crystals comprising between about 50 and 54 weight per cent hydrogen fluoride and then melting the crystals to obtain a solution more concentrated with respect to hydrogen fluoride than the original solution. The solution should be cooled to a temperature between about −55 and about −69° C. The range of crystallization for this embodiment is shown in Figure 1 between eutectic A and congruent point B.

Since it has heretofore been difficult if not impossible to recover substantially pure anhydrous hydrogen fluoride from a water mixture thereof, the present invention offers a sizable advance in the art. According to another embodiment of this invention hydrogen fluoride containing a minor amount of water, usually between about 1 and about 10 weight per cent, is cooled to a temperature sufficiently low to form crystals of substantially pure anhydrous hydrogen fluoride. The hydrogen fluoride containing a minor amount of water is cooled to a temperature between about −100 and about −83° C. Crystals are separated from lean liquor and may be remelted as a substantially pure anhydrous product. This embodiment is operable within the range to the right of eutectic C of Figure 1.

In many instances it is more desirable to concentrate an aqueous solution of hydrogen fluoride by crystallization than by other methods, such as distillation, since the corrosiveness of the aqueous solution of hydrogen fluoride is at a minimum at the low temperatures of crystallization. Furthermore, the hydrogen fluoride or solution thereof is often used at low temperatures, such as in an alkylation process for the conversion of hydrocarbons, and, consequently, in one respect relatively little cooling is necessary to attain the temperature of crystallization, or after crystallization and purification to attain the temperature of the process in which the hydrogen fluoride is to be used.

The crystallization process itself may be carried out in a batchwise or continuous manner using various types of crystallization apparatus familiar to those skilled in the art. Conventional refrigeration methods are used to cool the mother liquor to the desired temperature of crystallization.

Types of crystallization apparatus which may be used to effect the crystallization of the hydrogen fluoride water solution are for example, the Howard crystallizer, the double pipe crystallizer, or the Swenson-Walker crystallizer, which are equipped with cooling coils or jackets. Common refrigerants which may be used as the cooling medium to be circulated within the cooling coils or jacket of the crystallizer comprise ethane, nitrous oxide, methyl chloride and dichlorodifluoromethane (Freon 12). In some instances it may be desirable to achieve the desired amount of cooling through the expansion of gases by the Joule-Thomson effect.

Figure 2:
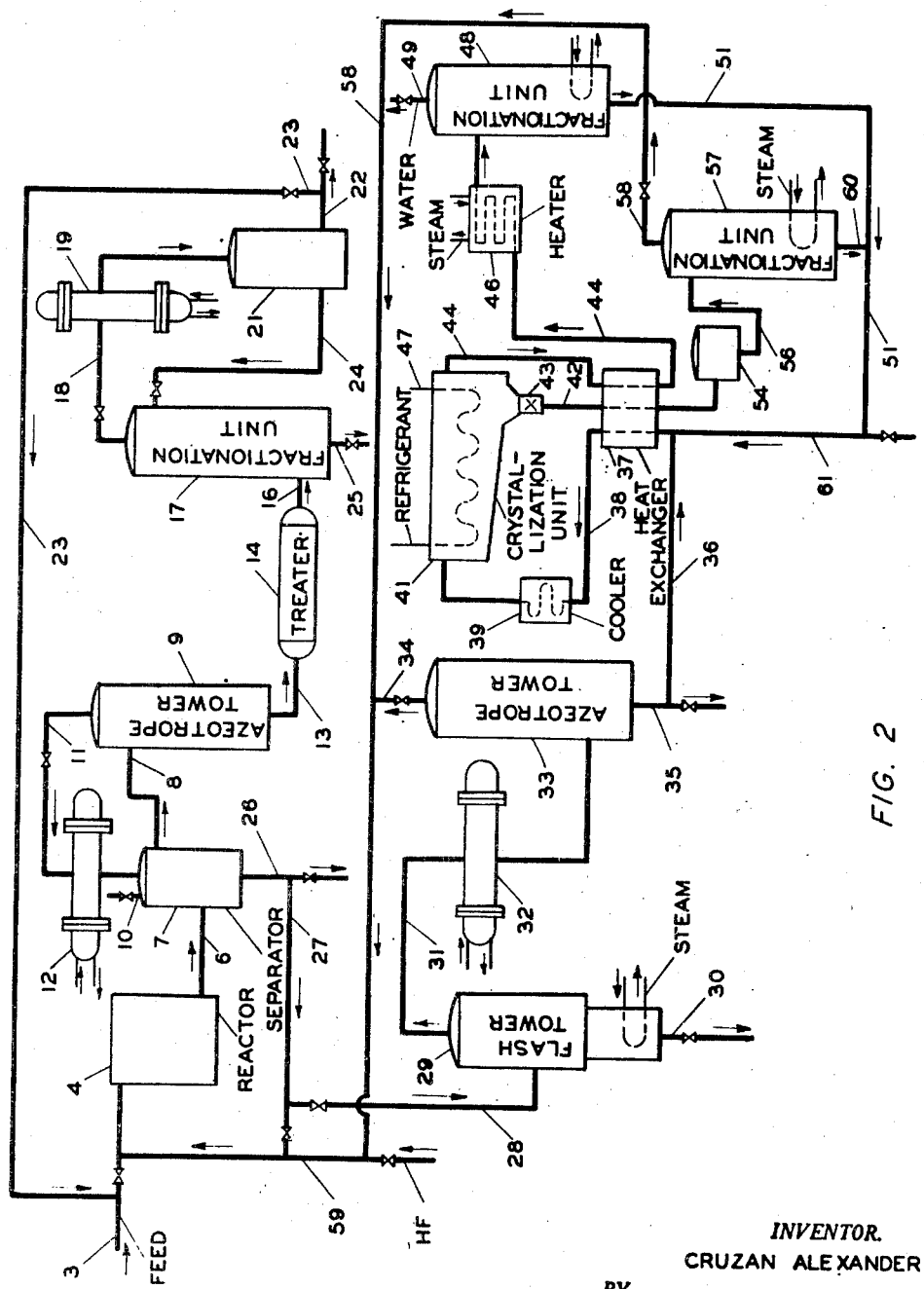

Figure 2 of the accompanying drawings is a diagrammatic illustration of apparatus in which an embodiment of the present invention may be carried out when applied to the alkylation of isobutane with olefins in the presence of hydrogen fluoride as the catalyst. A suitable and typical feed stock for hydrogen fluoride alkylation appears in the table below:

| Component | Mol Per Cent |
|---|---|
| Isobutane | 68 |
| Isobutylene | 8 |
| Normal Butylene | 13 |
| Butane | 10 |
| Other Hydrocarbons | 1 |
| | 100 |

The overall mol ratio of isoparaffin to olefin is usually from about 4:1 to about 20:1 in the combined feed and recycle, and much higher in the reaction zone. The time of residence of the reaction mixture in the reactor 4 is usually from about 5 to about 15 minutes, but it may be shorter or longer as desired. The volume ratio of acid to hydrocarbon is between approximately 0.5:1 and 2:1, generally about 1:1, although other ratios may be maintained. The hydrocarbon feed stock enters the alkylation process through line 3 and passes to reactor 4 as a liquid at a temperature of about 30° F. to about 125° F. and a pressure of about 25 to about 100 pounds per square inch gage. Should it be desired, however, both higher pressures and higher temperatures may be used. In general, only sufficient pressure to assure liquid phase operation is necessary.

From reactor 4, a hydrocarbon conversion effluent is passed by line 6 to separator 7 in which the effluent separates into two liquid phases, a lighter liquid hydrocarbon-rich phase and heavier liquid hydrogen fluoride-rich phase. The hydrogen fluoride phase is withdrawn from the bottom of separator 7 through line 26 to be recycled as a catalyst for the alkylation reaction by passing from line 26 through line 27 to line 59 and thence to reactor 4. It may be desirable to remove water from the hydrogen fluoride and for this purpose a portion or all of the hydrogen fluoride is passed through a purification system, the operation of which will be discussed completely hereinafter.

The liquid hydrocarbon phase passes from separator 7 to azeotrope tower 9 by line 8. Separation of an azeotropic mixture of hydrocarbons and hydrogen fluoride from the hydrocarbon phase is effected in tower 9. This azeotropic mixture passes as a vapor from tower 9 through line 11 and condenser 12 to separator 7. A liquid hydrocarbon stream, substantially free from hydrogen fluoride but containing small amounts of organic fluoride compounds, passes from the bottom of tower 9 through line 13 to treater 14. These organic fluorine compounds, which are formed as by-products of the hydrocarbon conversion, are removed by treatment with a suitable agent, such as bauxite or alumina, in treater 14.

The liquid hydrocarbon stream, now substantially free from organic fluorine compounds, passes through line 16 to fractionation unit 17 which may represent either a single deisobutanizer or a series of fractionators for the separation of various components of the hydrocarbon conversion effluent. This liquid hydrocarbon stream which constitutes the hydrocarbon conversion effluent has approximately the following composition at this point in the process.

| Hydrocarbon Component | Mol Per Cent |
|---|---|
| Propane and lighter hydrocarbons | 0.4 |
| Isobutane | 53.4 |
| Normal Butane | 31.2 |
| Alkylate | 15.0 |
| | 100.0 |

In case fractionator 17 is a deisobutanizer, normal butane and heavier hydrocarbons are separated from isobutane and lighter hydrocarbons therein. The overhead fraction containing the isobutane and lighter hydrocarbons is passed by line 17 and through condenser 19 to accumulator 21. A portion of the condensed overhead fraction is recycled to fractionator 17 through line 24 as a liquid reflux.

The isobutane may be separated from the lighter hydrocarbons by further treatment (not shown) by withdrawing the isobutane from the system through line 22, or a portion or all of the overhead product after condensation may be recycled from accumulator 21 to reactor 4 by line 23, particularly when the proportion of propane and lighter hydrocarbons is relatively so small that the pressure limitations of the subsequent separator are not exceeded.

Butane and heavier hydrocarbons, including the alkylation products, are withdrawn from fractionator 17 by line 25 and are conveyed to subsequent fractionators (not shown) for separation of the alkylation products from butane and other materials as desired.

Line 10 on separator 7 is a vent for the removal of propane and lighter hydrocarbons from the system and serves also to maintain the required pressure limitations on the process equipment.

The hydrogen fluoride phase from separator 7 will accumulate sufficient water because of its continuous recycle to reactor 4 to decrease the catalytic activity of the hydrogen fluoride and also to acquire corrosive characteristics toward the iron or steel process equipment which it contacts. It is, therefore, desirable to remove water from at least a portion of the hydrogen fluoride before it is recycled to reactor 4. All or a portion of the hydrogen fluoride phase from separator 7 is passed to flash tower 29 via lines 26, 27 and 28 as the first step in recovery of anhydrous, or more highly concentrated, hydrogen fluoride.

Flash tower 29 effects a separation of the hydrogen fluoride phase from separator 7 into a purified hydrogen fluoride fraction, which is taken overhead through line 31 and condenser 32 to azeotrope tower 33; and a hydrocarbon fraction, consisting essentially of heavy polymers and alkylates contaminating the hydrogen fluoride phase, the latter fraction being withdrawn from the bottom of flash tower 29 through line 30. A small amount of light hydrocarbons may also be carried overhead with the purified hydrogen fluoride.

In azeotrope tower 33, any water that is present in the hydrogen fluoride is removed by line 35 as an azeotropic or maximum boiling mixture of water and hydrogen fluoride. Anhydrous hydrogen fluoride is withdrawn overhead from azeotrope tower 33 through line 34 into line 58 after which it is recycled to reactor 4 via line 59. Make-up hydrogen fluoride may be added to the alkylation system through line 59, when necessary.

Any danger of an azeotropic mixture of hydrogen fluoride and water, which might be corrosive to the construction material, accumulating in flash tower 29 is eliminated by maintaining the top temperature of the flash tower 29 sufficiently high to assure that water is carried overhead. The azeotropic mixture referred to boils at approximately 220° F. at atmospheric pressure, and at a higher temperature under superatmospheric pressures.

In order to recover the hydrogen fluoride contained in the liquid azeotropic mixture which is removed from the bottom of azeotropic tower 33 rather than to discard the mixture, which would amount to a substantial economic loss of hydrogen fluoride, the mixture is passed from tower 33 through lines 35 and 36 to heat exchanger 37. From heat exchanger 37 the azeotropic mixture is passed to crystallization unit 41 through line 38 and cooler 39. In cooler 39 the azeotropic mixture is cooled to approximately the crystallization temperature of the azeotropic mixture. Preferably, the azeotropic mixture is not cooled sufficiently low to form crystals in cooler 39. The azeotropic mixture is further cooled in crystallization unit 41 by cooling coils 47. A suitable refrigerant, as previously discussed, is passed through coils 47 to cool the mixture of solution sufficiently to form crystals in crystallization unit 41. The crystals comprise approximately 52 per cent hydrogen fluoride and 48 per cent water. In the preferred embodiment of the present invention the crystals and solution flow concurrently through crystallization unit 41 during which time crystals are formed and are deposited in crystallization unit 41. Lean mother liquor is removed from crystallization unit 41 through line 44. Crystals are removed from crystallization unit 41 through line 42 by means of star valve 43. Crystals and lean liquor pass through lines 42 and 44, respectively, to heat exchanger 37. Lean liquor passing from crystallization unit 41 through line 44 comprises about 30 weight per cent hydrogen fluoride and is passed to heater 46 and then fractionation unit 48. In fractionation unit 48 the mixture is fractionated into two fractions, an overhead fraction comprising water vapor and a bottom fraction comprising an azeotropic mixture of water and hydrogen fluoride. The bottom fraction is removed from fractionation unit 48 through line 51 and is recycled to crystallization unit 41 through lines 61 and 38. The overhead fraction is removed from fractionator 48 through line 49.

Crystals from crystallization unit 41 passing through line 42 are melted in heat exchanger 37 and the resulting melt is passed to accumulator 54. The melt in accumulator 54 is passed as a liquid through line 56 to fractionation unit 57 in which is formed an overhead fraction comprising hydrogen fluoride and a bottom fraction comprising an azeotropic mixture of hydrogen fluoride and water. The overhead fraction comprising anhydrous hydrogen fluoride is removed from fractionation unit 57 through line 58 and recycled to reactor 4 through lines 58 and 59 as a catalyst. The bottom fraction or azeotropic mixture from fractionation unit 57 is removed therefrom through line 60 and recycled to crystallization unit 41 through lines 51, 61 and 38. By recycling the various bottom fractions from fractionation units 48 and 57, complete recovery of the hydrogen fluoride as a substantially anhydrous product is accomplished.

The hydrogen fluoride recovered contains substantially no water and is about 99 per cent pure.

Although the invention has been described with particular reference to a hydrocarbon conversion process carried out in a particular manner, various modifications and other applications will occur to those skilled in the art which may be practiced without departing from the scope of the invention. For example, both cooler 39 and heater 46 may be omitted, the cooling of the azeotropic mixture being accomplished entirely by cooling coils 47 and the heating of the lean mother liquor being accomplished entirely in fractionation unit 48. It also may be necessary to supply additional heat to the crystals in line 42 than can be obtained from heat exchanger 37, so in such a situation an additional heater may be provided on line 42.

I claim:

1. In a process for the alkylation of a low-boiling isoparaffin with a low-boiling olefin in the presence of hydrogen fluoride as a catalyst in which a hydrocarbon conversion effluent is separated into a liquid hydrocarbon-rich phase and a liquid hydrogen fluoride-rich phase and said liquid hydrogen fluoride-rich phase is distilled into an overhead fraction comprising substantially anhydrous hydrogen fluoride and a bottom fraction comprising substantially an azeotropic mixture of water and hydrogen fluoride, the improvement which comprises passing said liquid azeotropic mixture to a crystallization zone, cooling said azeotropic mixture in said crystallization zone to a temperature between about −55 and about −69° C. to form crystals comprising between about 50 and about 54 weight per cent hydrogen fluoride, removing said crystals from said crystallization zone and melting same, passing said melted crystals as a liquid to a first fractional distillation, recovering hydrogen fluoride as an overhead product from said first fractional distillation, recycling said recovered hydrogen fluoride to said alkylation process as a catalyst, removing an azeotropic mixture of hydrogen fluoride and water as a liquid bottom product from said first fractional distillation, recycling said bottom product from said first fractional distillation to said crystallization zone, removing a lean liquid comprising not less than about 30 weight per cent hydrogen fluoride from said crystallization zone, passing said lean liquid to a second fractional distillation, removing water as an overhead product and an azeotropic mixture of water and hydrogen fluoride as a bottom product from said second fractional distillation, and recycling said bottom product from said second fractional distillation to said crystallization zone.

2. In a process for the alkylation of a low-boiling isoparaffin with an olefin in the presence of hydrogen fluoride as a catalyst in which a hydrocarbon conversion effluent is separated into a liquid hydrocarbon-rich phase and a liquid hydrogen fluoride-rich phase and said liquid hydrogen fluoride is distilled into an overhead fraction comprising essentially vaporous hydrogen fluoride and a bottom fraction comprising substantially a liquid azeotropic mixture of water and hydrogen fluoride, the improvement which comprises passing said liquid azeotropic mixture to a crystallization zone, cooling said azeotropic mixture in said crystallization zone to form crystals, removing said crystals thus-formed from said crystallization zone and melting same, passing said melted crystals as a liquid to a first fractional distillation, recovering hydrogen fluoride as an overhead fraction from said first fractional distillation, recycling said recovered hydrogen fluoride to said alkylation process as a catalyst, removing an azeotropic mixture of hydrogen fluoride and water as a bottom fraction from said first fractional distillation, recycling said bottom fraction from said first fractional distillation to said crystallization zone, removing a lean liquid from said crystallization zone, passing said lean liquid to a second fractional distillation, removing water as an overhead product and azeotropic mixture of water and hydrogen fluoride as a bottom product from said second fractional distillation, and recycling said bottom product from said second fractional distillation to said crystallization zone.

3. The method of recovering hydrogen fluoride from an azeotropic mixture of the same with water, which comprises passing said liquid azeotropic mixture to a crystallization zone, cooling said azeotropic mixture in said crystallization zone to a temperature between about —55 and about —69° C. to form crystals comprising between about 50 and about 54 weight per cent hydrogen fluoride, removing said crystals from said crystallization zone and melting same, passing said melted crystals as a liquid to a first fractional distillation, recovering hydrogen fluoride as an overhead product from said first fractional distillation, removing an azeotropic mixture of hydrogen fluoride and water as a liquid bottom product from said first fractional distillation, recycling said bottom product from said first fractional distillation to said crystallization zone, removing a lean liquid comprising not less than about 30 weight per cent hydrogen fluoride from said crystallization zone, passing said lean liquid to a second fractional distillation, removing water as an overhead product and an azeotropic mixture of water and hydrogen fluoride as a bottom product from said second fractional distillation, and recycling said bottom product from said second fractional distillation to said crystallization zone.

4. In a process for the alkylation of a low-boiling isoparaffin with an olefin in the presence of hydrogen fluoride as a catalyst in which a hydrocarbon conversion effluent is separated into a liquid hydrocarbon-rich phase and a liquid hydrogen fluoride-rich phase and said liquid hydrogen fluoride is distilled into an overhead fraction comprising essentially vaporous hydrogen fluoride and a bottom fraction comprising substantially a liquid azeotropic mixture of water and hydrogen fluoride, the improvement which comprises passing said liquid azeotropic mixture to a crystallization zone, cooling said azeotropic mixture in said crystallization zone to form crystals, removing said crystals thus formed from said crystallization zone and melting same, passing said melted crystals as a liquid to a fractional distillation, recovering hydrogen fluoride as an overhead fraction from said fractional distillation, recycling said recovered hydrogen fluoride to said alkylation process as a catalyst, removing an azeotropic mixture of hydrogen fluoride and water as a bottom fraction from said fractional distillation, and recycling said bottom fraction from said fractional distillation to said crystallization zone.

5. In a process for the alkylation of a low-boiling isoparaffin with an olefin in the presence of hydrogen fluoride as a catalyst in which a hydrocarbon conversion effluent is separated into a liquid hydrocarbon-rich phase and a liquid hydrogen fluoride-rich phase and said liquid hydrogen fluoride is distilled into an overhead fraction comprising essentially vaporous hydrogen fluoride and a bottom fraction comprising substantially a liquid azeotropic mixture of water and hydrogen fluoride, the improvement which comprises cooling said azeotropic mixture to form crystals, recovering said crystals thus-formed and melting same, passing said melted crystals as a liquid to a fractional distillation, recovering hydrogen fluoride as an overhead fraction from said fractional distillation, recycling said recovered hydrogen fluoride to said alkylation process as a catalyst, and removing an azeotropic mixture of hydrogen fluoride and water as a bottom fraction from said fractional distillation.

6. The method for recovering hydrogen fluoride from an azeotropic mixture of the same with water, which comprises cooling said azeotropic mixture to form crystals, recovering said crystals thus formed and melting same, passing said melted crystals as a liquid to a fractional distillation, and recovering hydrogen fluoride as overhead product from said fractional distillation.

7. A method for concentrating an aqueous solution of hydrogen fluoride containing between about 30 and about 52 per cent hydrogen fluoride, which comprises cooling said aqueous solution to a temperature between about —55 and about —100° C. to form crystals, said temperature of crystallization being determined by the concentration of aqueous solution desired, and recovering an aqueous solution more concentrated in hydrogen fluoride than the original solution.

8. A method for concentrating an aqueous solution of hydrogen fluoride containing between about 30 and about 52 per cent hydrogen fluoride which comprises cooling said aqueous solution to a temperature between about —55 and about —69° C. to form crystals, recovering said crystals, and melting same to form an aqueous solution more concentrated in hydrogen fluoride than the original solution.

9. A method for obtaining substantially pure anhydrous hydrogen fluoride from an aqueous mixture containing between about 1 and about 10 weight per cent water, which comprises cooling said mixture between about —83 and about —100° C. to form crystals, and recovering said crystals as a substantially pure anhydrous hydrogen fluoride product.

10. A method for concentrating an aqueous solution of hydrogen fluoride, which comprises cooling said aqueous solution to a temperature sufficiently low to form a solid phase and a liquid phase, one of which phases is more concentrated with respect to hydrogen fluoride than the other phase, and recovering said phase more concentrated with respect to hydrogen fluoride as a product of the process.

11. The method of recovering hydrogen fluoride from an azeotropic mixture of the same with water, which comprises cooling said mixture so as to form crystals, recovering and melting said crystals, passing the resulting melt as a liquid to a fractional distillation, recovering hydrogen fluoride as an overhead product from said fractional distillation, and recycling a bottom fraction comprising hydrogen fluoride and water to the cooling step.

12. A method for concenerating an aqueous solution of hydrogen fluoride, which comprises cooling said aqueous solution to a temperature sufficently low to form a solid phase and a liquid phase, one of which phases is more concentrated with respect to hydrogen fluoride than the other phase, recovering said phase more concentrated with respect to hydrogen fluoride as a product of the process, passing the less concentrated phase to a fractional distillation, and recovering the fraction more concentrated with respect to hydrogen fluoride.

13. In a process for the treatment of hydrocarbons in the presence of hydrogen fluoride in which a hydrocarbon effluent is separated into a liquid hydrocarbon-rich phase and a liquid hydrogen fluoride-rich phase and said liquid hydrogen fluoride is distilled into an overhead fraction comprising essentially vaporous hydrogen fluoride and a bottom fraction comprising substantially a liquid azeotropic mixture of water and hydrogen fluoride, the improvement which comprises cooling said azeotropic mixture to form crystals, recovering said crystals thus formed and melting same, passing said melted crystals as a liquid to a fractional distillation, recovering hydrogen fluoride as an overhead fraction from said fractional distillation, recycling said recovered hydrogen fluoride to the treatment step, and removing an azeotropic mixture of hydrogen fluoride and water as a bottom fraction from said fractional distillation.

CRUZAN ALEXANDER.

REFERENCES CITED

The following references are of record in the file of this patent:

UNITED STATES PATENTS

| Number | Name | Date |
|---|---|---|
| 2,070,098 | Twomey | Feb. 9, 1937 |
| 2,320,629 | Matuszak | June 1, 1943 |
| 2,378,636 | Iverson | June 19, 1945 |
| 2,388,156 | Kelley | Oct. 30, 1945 |
| 2,398,526 | Greenburg | Apr. 16, 1946 |

OTHER REFERENCES

Hougen et al., Chemical Process Principles, part I, Wiley and Sons, Inc., 1943, pages 114 to 118.

Thorpe, Dictionary of Applied Chemistry, vol. III, page 231, 1922, Longmans, Green and Co., New York city.